(12) United States Patent
Aarts et al.

(10) Patent No.: US 6,594,205 B1
(45) Date of Patent: Jul. 15, 2003

(54) OPTICAL SCANNING DEVICE WITH PARALLEL-CONTROLLED ACTUATORS

(75) Inventors: Jan W. Aarts, Eindhoven (NL); Jan P. Baartman, Eindhoven (NL); Gerard E. Van Rosmalen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/498,259

(22) Filed: Feb. 3, 2000

(30) Foreign Application Priority Data

Feb. 3, 1999 (EP) ............................................. 99200318

(51) Int. Cl.⁷ ................................................. G11B 7/00
(52) U.S. Cl. ................................ 369/44.23; 369/44.29; 369/53.28; 369/112.24; 369/44.16
(58) Field of Search ........................... 369/44.23, 44.29, 369/44.35, 53.28, 112.24, 44.15, 44.16

(56) References Cited

U.S. PATENT DOCUMENTS

| 4,327,434 A | * | 4/1982 | Christopher | ................ 359/220 |
| 5,299,184 A | * | 3/1994 | Yamano et al. | ........... 369/44.28 |
| 5,452,275 A | * | 9/1995 | Ogawa | ..................... 369/44.11 |
| 5,485,451 A | * | 1/1996 | Yamano et al. | .............. 369/126 |
| 5,551,360 A | * | 9/1996 | Qui | ........................ 112/470.01 |
| 5,712,842 A | | 1/1998 | Yamamoto et al. | .......... 369/112 |
| 6,036,162 A | * | 3/2000 | Hayashi | ....................... 248/550 |

* cited by examiner

Primary Examiner—Doris H. To
Assistant Examiner—Gautam R. Patel

(57) ABSTRACT

An optical scanning device includes a radiation source; an optical lens system with an optical axis for focusing a radiation beam supplied, in operation, by the radiation source into a scanning spot on an information carrier, the lens system including a housing, a first lens which is secured in the housing in a fixed position, and a second lens which, viewed in a direction parallel to the optical axis, is elastically suspended in the housing; a first actuator for displacing the lens system in a direction parallel to the optical axis; a first control unit for controlling the first actuator by means of a first control signal; a second actuator for displacing the second lens relative to the first lens in a direction parallel to the optical axis; and a second control unit for controlling the second actuator by means of a second control signal, and in which during operation, the first control unit also controls the second actuator by means of a third control signal which is proportional to the first control signal.

7 Claims, 2 Drawing Sheets

OPTICAL SCANNING DEVICE WITH PARALLEL-CONTROLLED ACTUATORS

TECHNICAL FIELD

Figure 1:
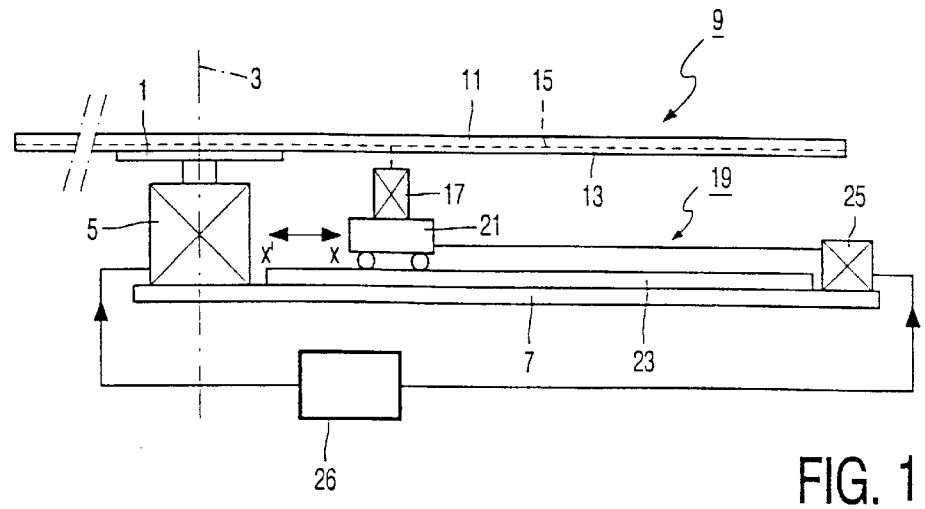

The invention relates to an optical scanning device for scanning an information track of an optically scannable information carrier, which scanning device is provided with a radiation source, an optical lens system with an optical axis for focusing a radiation beam supplied, in operation, by the radiation source into a scanning spot on the information carrier, a first actuator for displacing the lens system in a direction parallel to the optical axis, and a first control unit for controlling the first actuator by means of a first control signal, said lens system being provided with a housing, a first lens which is secured in the housing in a fixed position, a second lens which, viewed in a direction parallel to the optical axis, is elastically suspended in the housing, and a second actuator by means of which the second lens can be displaced relatively to the first lens in a direction parallel to the optical axis, while the scanning unit is provided with a second control unit for controlling the second actuator by means of a second control signal.

The invention also relates to an optical player provided with a table which is capable of being rotated about an axis of rotation, an optical scanning device for scanning an information track of an optically scannable information carrier which can be placed on said table, and a displacement device by means of which the scanning device can be displaced relatively to the axis of rotation substantially in a radial direction.

BACKGROUND AND SUMMARY

An optical scanning device of the type mentioned in the opening paragraphs, and an optical player of the type mentioned in the opening paragraphs, which is provided with such a scanning device, are disclosed in U.S. Pat. No. 5,712,842. The first lens of the lens system of the known scanning device is a main lens of the lens system and is commonly referred to as objective lens. The second lens of the lens system is an auxiliary lens of the lens system and is commonly referred to as solid-immersion lens, which is relatively small and is suspended, by means of a leaf spring, in the housing of the lens system between the objective lens and the information carrier to be scanned. By using the auxiliary lens, the lens system has a relatively large numerical aperture, so that a relatively small scanning spot is provided on the information carrier to be scanned. As a result, the known scanning device can suitably be used to scan information carriers having relatively small elementary information characteristics, i.e. information carriers having a relatively high information density, such as a high-density CD. By means of the first actuator of the known scanning device, the lens system can be bodily displaced in a direction parallel to the optical axis, so that the scanning spot can be focused on the information carrier. In this case, the first control signal, with which h the first actuator can be controlled by the first control unit, is determined by a focusing error which can be measured by means of a focusing error detector of the known scanning device. By means of the second actuator of the known scanning device, the elastically suspended auxiliary lens can be displaced within the lens system with respect to the main lens in a direction parallel to the optical axis, so that a spherical aberration of the radiation beam in a transparent protective layer applied to the information carrier can be corrected. In this case, the second control signal, with which the second actuator can be controlled by the second control unit, is determined by a spherical aberration in said protective layer which is measurable by means of a further optical detector of the known scanning device.

A drawback of the known optical scanning device and the known optical player resides in that the auxiliary lens and said leaf spring form, within the lens system, a substantially undamped mass spring system. As a result, substantially undamped displacements of the auxiliary lens with respect to the main lens occur if the lens system is displaced by the first actuator for correcting focusing errors at a frequency which is equal, or substantially equal, to a natural frequency of said mass spring system. Such undamped displacements of the auxiliary lens with respect to the main lens lead to inaccurate correction of the focusing errors, and are consequently undesirable.

It is an object of the invention to provide an optical scanning device and an optical player of the types mentioned in the opening paragraphs, wherein said drawback of the known optical scanning device and the known optical player are precluded as much as possible.

To achieve this, an optical scanning device in accordance with the invention is characterized in that, in operation, the first control unit also controls the second actuator by means of a third control signal which is proportional to the first control signal.

To achieve the above-mentioned object, an optical player in accordance with the invention is characterized in that the optical scanning device employed therein is an optical scanning device in accordance with the invention.

The first actuator and the second actuator preferably are so-called force actuators, such as Lorentz force actuators. Such force actuators supply a force which is determined by, and preferably substantially proportional to, a control signal by which the force actuators are controlled. Since the first control unit of the scanning device in accordance with the invention does not only control the first actuator by means of the first control signal, but also the second actuator by means of the third control signal which is proportional to the first control signal, the second actuator exerts a force on the second lens, as a result of the third control signal, which force is proportional to a force which is exerted on the entire lens system by the first actuator. By a suitable ratio between the first control signal and the third control signal, it is achieved that the second lens and the entire lens system are displaced at equal accelerations as a result of, respectively, the third control signal and the first control signal. Due to this, the second lens, which is elastically suspended in the housing, follows the displacements of the housing of the lens system, and it is precluded that the second lens is displaced with respect to the housing and the first lens if the lens system is bodily displaced by means of the first actuator. In this manner, also the development of substantially undamped displacements of the second lens with respect to the first lens is precluded as much as possible during displacements of the lens system by the first actuator at a frequency equal to, or substantially equal to, the natural frequency of the mass spring system formed by the second lens and the suspension thereof. Apart from displacements caused by the third control signal, the second lens must carry out displacements with respect to the first lens, which are determined by said second control signal. To this end, the second actuator is controlled, for example, by a control signal which is a sum of the second control signal and the third control signal.

A particular embodiment of an optical scanning device in accordance with the invention is characterized in that the second lens is a main lens of the lens system, while the first lens is an auxiliary lens of the lens system, which is arranged between the second lens and the information carrier to be scanned. The main lens is, for example, a relatively large objective lens, while the auxiliary lens is, for example, a relatively small solid-immersion lens. By virtue of the fact that the relatively large objective lens is elastically suspended in the housing, the second actuator and the elastic suspension of the second lens are dimensioned such that they can be handled, so that a necessary miniaturization of the second actuator and the elastic suspension is limited as much as possible.

A further embodiment of an optical scanning device in accordance with the invention is characterized in that the first control unit is connected to the second actuator via a low-pass filter. By using said low-pass filter, high-frequency components of the third control signal are filtered out, in particular high-frequency components having a frequency which is high with respect to the natural frequency of the mass-spring system formed by the second lens and the suspension thereof. As a result, it is achieved that the second lens substantially does not follow displacements of the lens system for correcting relatively high-frequency focusing errors. In this manner it is achieved that a mass, which is to be displaced by the first actuator to correct high-frequency focusing errors, is limited mainly to the masses of the housing and the first lens of the lens system, so that the forces to be supplied by the first actuator to correct high-frequency, focusing errors, and hence the necessary power of the first actuator, are limited. Such a limitation is achieved, in particular, if the elastically suspended second lens is the main lens of the lens system. Consequently, in this further embodiment, high-frequency focusing errors are corrected substantially only by means of displacements of the first lens, which has proved to be feasible in practice because high-frequency focusing errors generally only have a relatively small amplitude.

Yet another embodiment of an optical scanning device in accordance with the invention is characterized in that the first control unit is connected to the second actuator via, successively, a high-pass filter and an adder for adding the second control signal and the third control signal. By using said high-pass filter, low-frequency components of the third control signal, in particular direct current components, are filtered out. In practice it has been found that said spherical aberration of the radiation beam can be sufficiently corrected by displacing the second lens once only with respect to the first lens, which displacement is determined by an average thickness of the protective layer of the information carrier to be scanned. Consequently, the second control signal generally is a direct current signal. Since low-frequency components of the third control signal are filtered out by the high-pass filter, it is precluded that a correction of the spherical aberration by means of the second control signal is influenced or disturbed by low-frequency components of the third control signal.

DESCRIPTION OF THE DRAWING FIGURES

These and other aspects of the invention will be apparent from and elucidated with reference to the embodiments described hereinafter.

Figure 2:
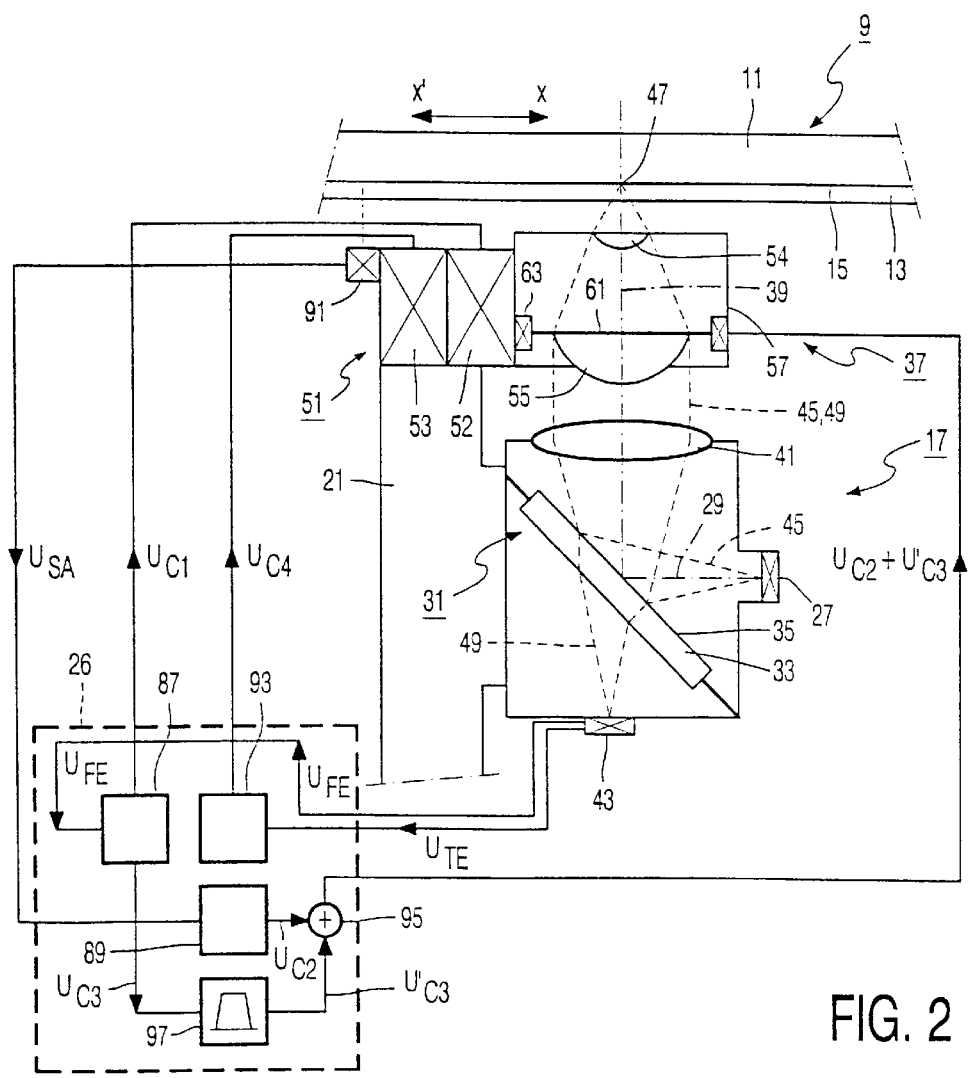
Figure 3:
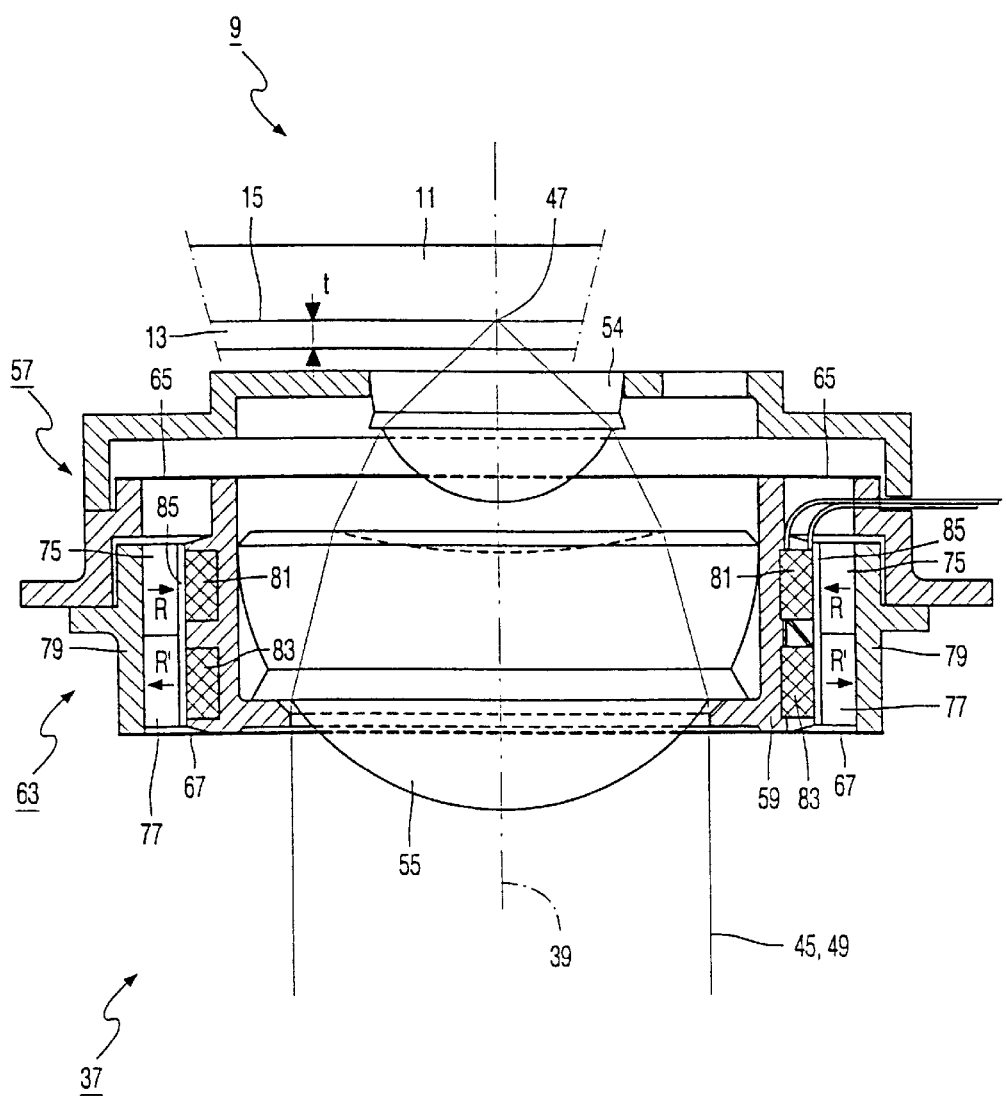

In the drawings:

FIG. 1 diagrammatically shows an optical player in accordance with the invention, FIG. 2 diagrammatically shows an optical scanning device in accordance with the invention, which can be used in the optical player shown in FIG. 1, and FIG. 3 shows an optical lens system of the scanning device shown in FIG. 2.

DESCRIPTION

FIG. 1 diagrammatically shows an optical player in accordance with the invention, which comprises a table 1 which is rotatable about an axis of rotation 3 and drivable by an electric motor 5 which is secured on a frame 7. On the table 1, an optically scannable information carrier 9, such as a CD, can be placed, which is provided with a disc-shaped carrier 11 and a transparent protective layer 13. A side of the carrier 11 bordering on the protective layer 13 forms an information layer 15 of the information carrier 9 on which a spiral-shaped information track is present. The optical player further comprises an optical scanning device 17 in accordance with the invention for optically scanning the information track of the information carrier 9. The scanning device 17 can be displaced with respect to the axis of rotation 3 substantially in two opposite radial directions X and X' by means of a displacement device 19 of the optical player. To this end, the scanning device 17 is secured to a slide 21 of the displacement device 19 which is further provided with a straight guide 23, which extends parallel to the X-direction and is provided on the frame 7, over which guide the slide 21 is displaceably guided, and with an electric motor 25 by means of which the slide 21 can be displaced over the guide. In operation, an electrical control member 26 of the optical player, which is only diagrammatically shown in FIG. 1, controls the motors 5 and 25 in such a manner that the information carrier 9 is made to rotate about the axis of rotation 3 and, simultaneously, the scanning device 17 is displaced parallel to the X-direction, in such a manner that the spiral-shaped information track present on the information carrier 9 is scanned by the scanning device 17. During scanning, the information present on the information track can be read by the scanning device 17, or information can be written on the information track by the scanning device 17.

The optical scanning device 17 in accordance with the invention used in the optical player in accordance with the invention is diagrammatically shown in FIG. 2. The scanning device 17 is provided with a radiation source 27, such as a semiconductor laser, with an optical axis 29. The scanning device 17 further comprises a radiation beam splitter 31 which comprises a transparent plate 33 which is arranged at an angle of 45° with respect to the optical axis 29 of the radiation source 27 and which includes a mirror surface 35 facing the radiation source 27. The scanning device 17 further comprises an optical lens system 37 with an optical axis 39 and a collimator lens 41 arranged between the radiation beam splitter 31 and the lens system 37. The optical axis 39 of the lens system 37 and the optical axis 29 of the radiation source 27 include an angle of 90°. The scanning device 17 further comprises an optical detector 43 which is of a customary type which is known per se, and which, with respect to the lens system 37, is arranged behind the radiation beam splitter 31. In operation, the radiation source 27 generates a radiation beam 45 which is reflected by the mirror surface 35 of the radiation beam splitter 31 and focused by the lens system 37 into a scanning spot 47 on the information layer 15 of the information carrier 9. The radiation beam 45 is reflected by the information layer 15 so as to form a reflected radiation beam 49 which is focused on the optical detector 43 via the lens system 37, the collimator lens 41 and the radiation beam splitter 31. To read the information present on the information carrier 9, the radiation source 27 generates a continuous radiation beam 45, the optical detector 43 supplying a detection signal which corresponds to a series of elementary information characteristics on the information track of the information carrier 9, which elementary information characteristics are successively present in the scanning spot 47. To write information on the information carrier 9, the radiation source 27 generates a radiation beam 45 which corresponds with information to be written, while in the scanning spot 47 there are generated a series of successive elementary information characteristics on the information track of the information carrier 9.

As is further shown in FIG. 2, the scanning device 17 comprises a first actuator 51 having a first part 52 and a second part 53. By means of the first part 52 of the first actuator 51, the lens system 37 can be displaced over relatively small distances in a direction parallel to the optical axis 39, while the lens system 37 can be displaced over relatively small distances in a direction parallel to the X-direction by means of the second part 53 of the first actuator 51. By displacing the lens system 37, by means of the first part 52 of the first actuator 51, in a direction parallel to the optical axis 39, the scanning spot 47 is focused on the information layer 15 of the information carrier 9 with a desired degree of accuracy. By displacing the lens system 37 in a direction parallel to the X-direction by means of the second part 53 of the first actuator 51, the scanning spot 47 is maintained, with a desired accuracy, on the information track to be followed. For this purpose, the first part 52 and the second part 53 of the first actuator 51 are controlled, in a manner which will be described in more detail hereinafter, by said control member 26.

The optical lens system 37 used in the optical scanning device 17 is shown in detail in FIG. 3, and comprises a first lens 54 and a second lens 55. The second lens 55 is an objective lens and forms a relatively large main lens of the lens system 37. The first lens 54 is a so-called solid-immersion lens which is arranged between the main lens 55 and the information carrier 9 to be scanned, and forms a relatively small auxiliary lens of the lens system 37. By employing said auxiliary lens 54 in addition to the main lens 55, the lens system 37 has a relatively large numerical aperture, so that the scanning spot 47 on the information layer 15 of the information carrier 9 is relatively small. As a result, the scanning device 17 can suitably be used for scanning optical information carriers having relatively small elementary information characteristics, i.e. optical information carriers having a relatively high information density, such as a high-density CD. As shown in FIG. 3, the auxiliary lens 54 is secured in a fixed position to a housing 57 of the lens system 37, said housing 57 being secured to the first actuator 51 and hence being displaceable by means of the first actuator 51. The main lens 55 is secured to a substantially ring-shaped holder 59 which, viewed in a direction parallel to the optical axis 39, is elastically suspended in the housing 57 by means of two ring-shaped diaphragms 65, 67 which, viewed in a direction parallel to the optical axis 39, are arranged at a distance from each other and extend transversely to the optical axis 39. Viewed parallel to the optical axis 39, the diaphragms 65, 67 are elastically deformable and, viewed in directions perpendicular to the optical axis 39, they are substantially non-deformable, so that, viewed in directions perpendicular to the optical axis 39, the diaphragms 65, 67 provide a very rigid bearing of the main lens 55 with respect to the housing 57, while, viewed in a direction parallel to the optical axis 39, the main lens 55 can be displaced relatively to the housing 57, thereby elastically deforming the diaphragms 65, 67.

As FIG. 3 further shows, the lens system 37 comprises a second actuator 63 by means of which the main lens 55 can be displaced with respect to the housing 57 and the auxiliary lens 54 in a direction parallel to the optical axis 39. By displacing the main lens 55 with respect to the auxiliary lens 54 by means of the second actuator 63 in a direction parallel to the optical axis 39, a spherical aberration of the radiation beam 45 in the transparent protective layer 13 of the information carrier 9 is corrected. Such a spherical aberration can be mainly attributed to fluctuations or deviations in the thickness t of the protective layer 13. The second actuator 63 is also controlled by said control member 26 in a manner to be described in more detail hereinafter. The second actuator 63 is arranged between the two diaphragms 65, 67 and is a so-called Lorentz force actuator. The second actuator 63 comprises two ring-shaped permanent magnets 75, 77 which, viewed in a direction parallel to the optical axis 39, are arranged next to each other and are secured to a substantially ring-shaped closing yoke 79 which is made of a magnetizable material and forms a separate part of the housing 57. The second actuator 63 further comprises two ring-shaped electrical coils 81, 83 which are secured to the holder 59 of the main lens 55. Viewed in a direction parallel to the optical axis 39, the coils 81, 83 are also arranged in a side-by-side relationship, the coil 81 being arranged opposite the magnet 75 and the coil 83 being arranged opposite the magnet 77, and a ring-shaped air gap 85 being present between the magnets 75, 77 and the coils 81, 83. The magnets 75, 77 are magnetized in opposite radial directions R and R' with respect to the optical axis 39, while, in operation, an electric current in the coil 81 and an electric current in the coil 83 have mutually opposite current directions. As a result, the electromagnetic forces which, in operation, are exerted on the coils 81 and 83 by an interaction between a magnetic field of the magnets 75, 77 and the electric current in the coils 81, 83, are directed parallel to the optical axis 39 and substantially in the same direction with respect to each other.

The second actuator 63 and the first part 52 and the second part 53 of the first actuator 51 are controlled by the control member 26 in the following manner. As shown in FIG. 2, the control member 26 comprises a first control unit 87 which, in operation, controls the first part 52 of the first actuator 51 by means of a control signal $u_{C1}$. The first control unit 87 receives a focus-error signal $u_{FE}$, which corresponds to a measured focusing error of the scanning spot 47 on the information layer 15 of the information carrier 9, and which is supplied by the optical detector 43. Such focusing errors lead to read and write errors of the scanning device 17 and hence are undesirable. In operation, the first control unit 87 determines the first control signal $u_{C1}$ in such a manner that the measured focusing error remains within predetermined limits. The control member 26 further comprises a second control unit 89 which, in operation, controls the second actuator 63 by means of a second control signal $u_{C2}$. The second control unit 89 receives a measuring signal $u_{SA}$, which corresponds to a measured spherical aberration of the radiation beam 45 in the protective layer 13 of the information carrier 9. Such a spherical aberration also leads to read and write errors of the scanning device 17 and hence is also undesirable. The measuring signal $u_{SA}$ is supplied by a further optical detector 91 of the scanning device 17, by means of which the thickness t of the protective layer 13 can be measured. The measuring signal $u_{SA}$ may alternatively be supplied by another type of optical detector. In operation, the second control unit 89 determines the second control signal $u_{C2}$ in such a manner that the measured spherical aberration of the radiation beam 45 in the protective layer 13 of the information carrier 9 remains within predetermined limits. As shown in FIG. 2, the second actuator 63 in accordance with the invention is also controlled by the first control unit 87 by means of a third control signal $u_{C3}$, as will be explained in greater detail hereinafter. The control member 26 further comprises a third control unit 93 which, in operation, controls the second part 53 of the first actuator 51 by means of a fourth control signal $u_{C4}$. The third control unit 93 receives a tracking error signal $u_{TE}$, which corresponds to a measured tracking error of the scanning spot 47 on the information track of the information carrier 9, and is also supplied by the optical detector 43. Such tracking errors also lead to read and write errors of the scanning device 17 and hence are also undesirable. In operation, the third control unit 93 determines the fourth control signal $u_{C4}$ in such a manner that the measured tracking error remains within predetermined limits.

In accordance with the invention, the second actuator 63 is controlled by the first control unit 87 for the reason, and in the manner, described hereinbelow. The main lens 55 and the ring-shaped diaphragms 65, 67 by means of which the main lens 55 is elastically suspended in the housing 57 of the lens system 37, viewed in a direction parallel to the optical axis 39, form a mass spring system within the lens system 37, having a natural frequency which is determined by a mechanical rigidity of the diaphragms 65, 67 and a mass of the main lens 55 and the holder 59. To limit a driving force of the second actuator 63 which is necessary to displace the main lens 55, the diaphragms 65, 67 have a limited rigidity, so that said mass spring system has a limited natural frequency. In the example shown, the natural frequency of said mass spring system is approximately 250 Hz. The focusing errors to be corrected by means of the first part 52 of the first actuator 51 have relatively low-frequency components, relatively high-frequency components, and components with a frequency in a medium-frequency range which comprises the natural frequency of said mass spring system. Since said mass spring system is substantially undamped, correction of the focusing errors at a frequency in the medium-frequency range would lead to substantially undamped resonating displacements of the main lens 55 with respect to the housing 57 and the auxiliary lens 54 if no further measures were taken. To preclude such resonating displacements of the main lens 55, the third control signal $u_{C3}$ in accordance with the invention is proportional to the first control signal $u_{C1}$. As the second actuator 63 is a Lorentz force actuator, the second actuator 63 exerts a force component $F_{C3}$ on the main lens 55, which force component is determined by the third control signal $u_{C3}$ and directed parallel to the optical axis 39, said force component being proportional to the third control signal $u_{C3}$ and hence also to the first control signal $u_{C1}$. Preferably, the first part 52 of the first actuator 51 also is a force actuator which exerts a force $F_{C1}$ on the entire lens system 37 in a direction parallel to the optical axis 39, which force is proportional to the first control signal $u_{C1}$. By virtue of the fact that the second actuator 63 and the first part 52 of the first actuator 51 are parallel-controlled by the first control unit 87, the force component $F_{C3}$ of the second actuator 63 is proportional to the force $F_{C1}$ of the first part 52 of the first actuator 51. By a suitable ratio between the first control signal $u_{C1}$, and the third control signal $u_{C3}$, it is achieved that the main lens 55 is displaced by means of the second actuator 63, as a result of the third control signal $u_{C3}$, in a direction parallel to the optical axis 39 at an acceleration which corresponds to an acceleration with which the entire lens system 37 is displaced by means of the first part 52 of the first actuator 51 in a direction parallel to the optical axis 39 as a result to of the first control signal $u_{C1}$. As a result, the main lens 55, which is elastically suspended in the housing 57, follows the displacements of the housing 57 of the lens system 37, which are directed parallel to the optical axis 39, so that said substantially undamped resonating displacements of the main lens 55 with respect to the housing 57 and the auxiliary lens 54 are precluded as much as possible. Said suitable ratio between the first control signal $u_{C1}$ and the third control signal $u_{C3}$ is determined by a ratio between the mass of the main lens 55 and the mass of the entire lens 37 and by the properties of the first part 52 of the first actuator 51 and the second actuator 63.

Apart from displacements resulting from the third control signal $u_{C3}$, the main lens 55 must also carry out displacements with respect to the housing 57 and the auxiliary lens 54, which are determined by the second control signal $u_{C2}$. For this purpose, the control member 26 includes an adder 95 which adds a control signal $u'_{C3}$, which will be described in greater detail hereinafter and which is derived from the third control signal $u_{C3}$, to the second control signal $u_{C2}$ and supplies a sum $u_{C2}+u'_{C3}$ of said control signals to the second actuator 63.

As is further shown in FIG. 2, the first control unit 87 is connected to the second actuator 63 via a pass filter 97 which is arranged between the first control unit 87 and the adder 95. Said pass filter 97 comprises both a low-pass filter, which filters out relatively high-frequency components in the control signal $u_{C3}$, i.e. components with a frequency which is an order higher than the natural frequency of said mass spring system, and a high-pass filter, which filters out relatively low-frequency components, particularly direct current components, in the control signal $u_{C3}$. The above-mentioned control signal $u'_{C3}$ is a control signal which is formed, as described above, by filtering the third control signal $u_{C3}$.

Since the pass filter 97 is provided with said low-pass filter, the main lens 55 substantially does not follow relatively high-frequency displacements of the lens system 37, for example displacements with a frequency above approximately 2500 Hz. As a result of the limited rigidity of the diaphragms 65 and 67, the main lens 55 even is substantially not displaced relatively to the fixed part of the scanning device 17 in the case of such high-frequency displacements of the lens system 37. Since the main lens 55 has substantial mass, the mass to be displaced by the first part 52 of the first actuator 51 is substantially limited in the case of such high-frequency displacements of the lens system 37. Since the forces to be generated by the first part 52 of the first actuator 51 are proportional to the mass to be displaced and to the square of the frequency of the displacements to be generated, the forces to be generated by the first part 52 of the first actuator 51 for correcting high-frequency focusing errors are limited substantially. Consequently, the high-frequency focusing errors are corrected substantially exclusively by means of displacements of the auxiliary lens 54. In practice, this proved to be possible in that such high-frequency focusing errors customarily have relatively small amplitudes.

Since the pass filter 97 is provided with said high-pass filter, direct current components are filtered from the third control signal $u_{C3}$. In practice it has been found that a spherical aberration of the radiation beam 45 in the protective layer 13 of the information carrier 9 can be sufficiently corrected in most cases by displacing the main lens 55 once-only with respect to the auxiliary lens 54, which displacement is determined by an average thickness of the protective layer 13. Consequently, in most cases the second control signal $u_{C2}$ is a direct current signal. Since said high-pass filter filters direct current components from the third control signal $u_{C3}$, it is precluded that a correction of said spherical aberration by means of the second control signal $u_{C2}$ is influenced or disturbed by direct current components or low-frequency components of the third control signal $u_{C3}$.

By means of the above-described optical player in accordance with the invention during scanning the information track of the information carrier 9, information present on the information track can be read or information can be written on the information track. It is noted that the invention also relates to optical players by means of which only information present on an information track of an information carrier can be read, and to optical players by means of which only information can be written on an information track of an information carrier.

In the case of the above-described scanning device 17 in accordance with the invention, the main lens 55 is elastically suspended in the housing 57 of the lens system 37, viewed in a direction parallel to the optical axis 39, while the auxiliary lens 54 is secured in a fixed position in the housing 57. It is noted that the invention also includes scanning devices wherein, as in the case of the scanning device described in U.S. Pat. No. 5,712,842, the main lens is secured in a fixed position in the housing of the lens system, and the auxiliary lens is elastically suspended in the housing, viewed in a direction parallel to the optical axis of the lens system.

In the above-described scanning device 17 in accordance with the invention, a ratio between the first control signal $u_{C1}$ and the third control signal $u_{C3}$ is determined such that the accelerations of, respectively, the main lens 55 and the entire lens system 37, generated by means of the second actuator 63 and the first part 52 of the first actuator 51, are substantially equal. It is noted that, in many cases, undesirable resonating movements of the main lens 55 in the housing 57 of the lens system 37 can also be sufficiently precluded if the generated accelerations of the main lens 55 and the lens system 37 are not entirely equal to each other. For example, such resonating movements can often be sufficiently precluded if the generated acceleration of the main lens 55 amounts to approximately 70% or less of the generated acceleration of the entire lens system 37.

As noted hereinabove, the second actuator 63 and the first part 52 of the first actuator 51 preferably are force actuators. In this case, a suitable ratio between the first control signal $u_{C1}$ and the third control signal $u_{C3}$ can be reliably determined and a reliable operation of the scanning device 17 is obtained. It is noted that the invention also includes scanning devices wherein the first actuator and the second actuator are of a different type, such as an actuator or motor wherein the control signal determines the displacement generated by the actuator or motor. In this case, however, a suitable ratio between the first control signal and the third control signal can be determined in a less reliable manner.

What is claimed is:

1. An optical scanning device, comprising:

a radiation source;

an optical lens system with an optical axis for focusing a radiation beam supplied, in operation, by the radiation source into a scanning spot on an information carrier, the lens system including: a housing; a first lens which is secured in the housing in a fixed position; and a second lens which, viewed in a direction parallel to the optical axis, is elastically suspended in the housing;

a first actuator for displacing the lens system in a direction parallel to the optical axis;

a first control unit for controlling the first actuator by means of a first control signal;

a second actuator for displacing the second lens relative to the first lens in a direction parallel to the optical axis; and a second control unit for controlling the second actuator by means of a second control signal, and in which during operation, the first control unit also controls the second actuator by means of a third control signal which is proportional to the first control signal.

2. The scanning device of claim 1, in which the second lens is a main lens of the lens system, the first lens is an auxiliary lens of the lens system, and the first lens is arranged between the second lens and the information carrier to be scanned.

3. The scanning device of claim 1, in which the scanning device further comprises a low-pass filter connected between the first control unit and the second actuator.

4. The scanning device of claim 1, in which:

the scanning device further comprises: a high-pass filter; and an adder for adding the second control signal and the third control signal; and the high-pass filter and the adder are connected in series between the first control unit and the second actuator.

5. The scanning device of claim 1, in which:

the second lens is a main lens of the lens system, the first lens is an auxiliary lens of the lens system, and the first lens is arranged between the second lens and the information carrier to be scanned;

the scanning device further comprises a low-pass filter connected between the first control unit and the second actuator;

the scanning device further comprises: a high-pass filter; and an adder for adding the second control signal and the third control signal; and the high-pass filter and the adder are connected in series between the first control unit and the second actuator.

6. The player of claim 1, in which:

the second lens is a main lens of the lens system, the first lens is an auxiliary lens of the lens system, and the first lens is arranged between the second lens and the information carrier to be scanned;

the scanning device further comprises a low-pass filter connected between the first control unit and the second actuator;

the scanning device further comprises: a high-pass filter; and an adder for adding the second control signal and the third control signal; and the high-pass filter and the adder are connected in series between the first control unit and the second actuator.

7. An optical player comprising:

a table which can be rotated about an axis of rotation;

an optical scanning device for scanning an information track of an optically scannable information carrier which can be displaced mainly in a radial direction with respect to the axis of rotation;

the optical scanning device including:

a radiation source;

an optical lens system with an optical axis for focusing a radiation beam supplied, in operation, by the radiation source into a scanning spot on an information carrier, the lens system including: a housing; a first lens which is secured in the housing in a fixed position; and a second lens which, viewed in a direction parallel to the optical axis, is elastically suspended in the housing;

a first actuator for displacing the lens system in a direction parallel to the optical axis;

a first control unit for controlling the first actuator by means of a first control signal;

a second actuator for displacing the second lens relative to the first lens.in a direction parallel to the optical axis;

a second control unit for controlling the second actuator by means of a second control signal, and in which during operation, the first control unit also controls the second actuator by means of a third control signal which is proportional to the first control signal.

* * * * *